United States Patent Office 3,390,933
Patented July 2, 1968

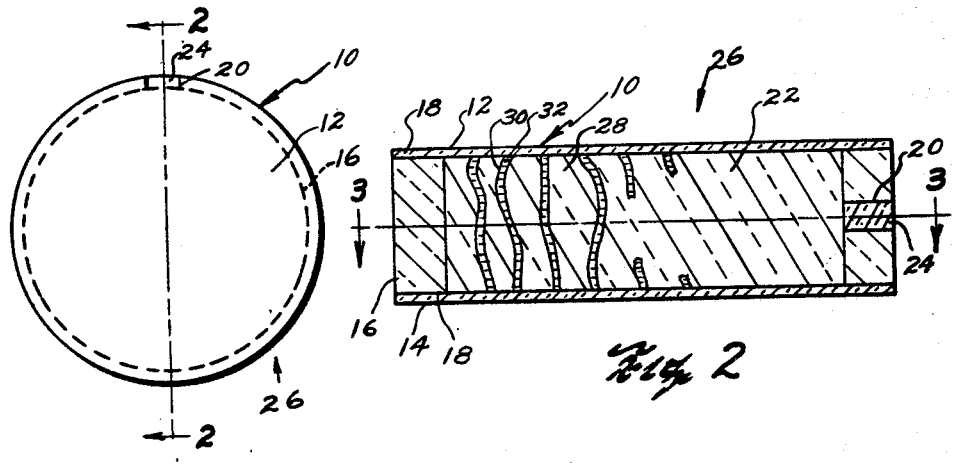
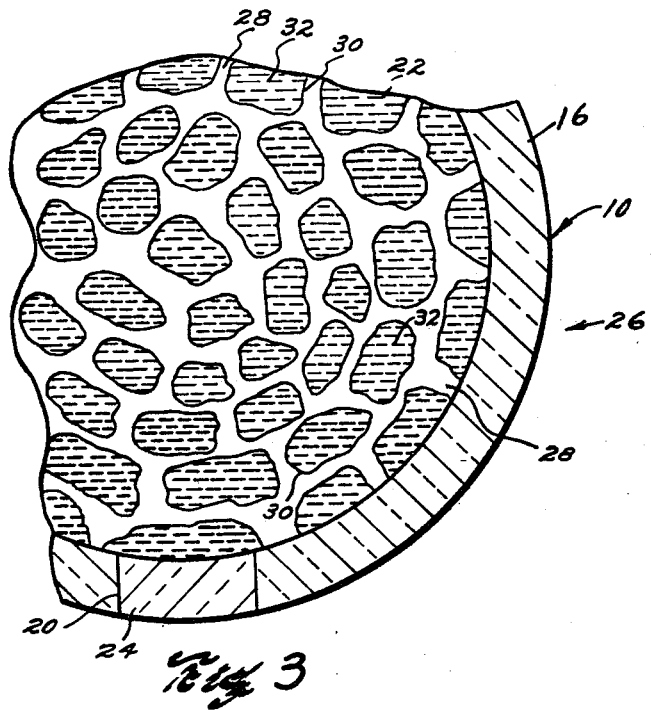

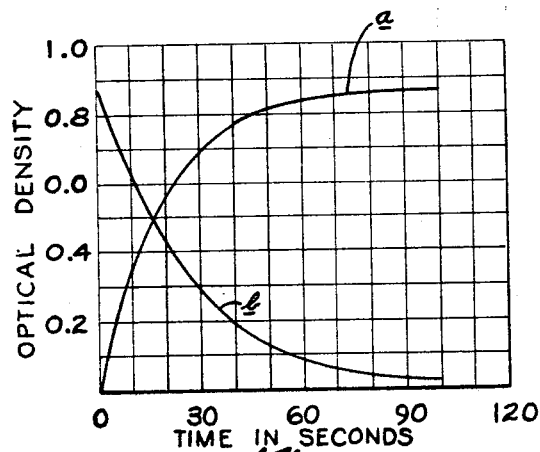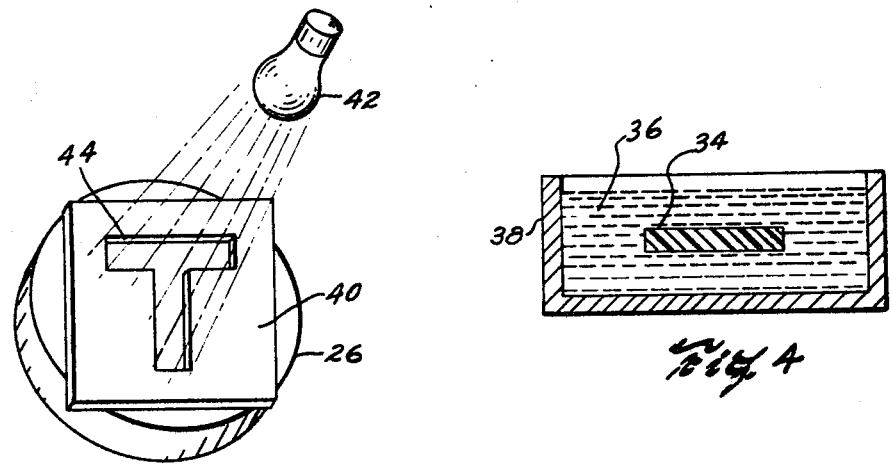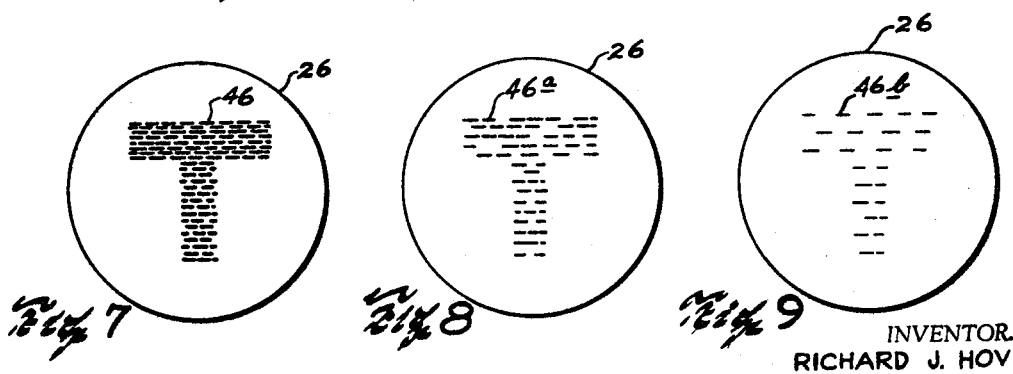

3,390,933
VARIABLE DENSITY LIGHT TRANSMITTING DEVICE
Richard J. Hovey, Worcester, and Donald O. Hoffman, Sturbridge, Mass., assignors, by mesne assignments, to American Optical Company, Southbridge, Mass., a corporation of Delaware
Filed Nov. 25, 1964, Ser. No. 413,823
4 Claims. (Cl. 350—160)

ABSTRACT OF THE DISCLOSURE

A photochromic device and the method for producing it, said device including a network of a light transmitting gel selected from the group consisting of silica gel and gelatine with a number of pores filled with the liquid phase of the gel. The liquid phase of the gel supports a solution of an acidified aqueous medium of dissolved photochromic thiazine dye and stannous chloride. The dye when irradiated with ultra-violet light changes to a colored form. The dye may be thereafter converted to its leuco form by withdrawal of the ultra-violet light.

---

The field of this invention is that of variable density light-transmitting devices and the invention relates more particularly to novel and improved light filter materials which vary in optical density in response to variations of incident light. The invention also relates to novel and improved methods for making such filter materials.

Light filter materials which vary in optical density in response to variations of incident light are useful in providing protection against frequent, sudden or substantial changes in light intensity. For example, when variable density filter materials are used in sunglasses, they can be completely transparent and can permit unrestricted vision in the shade but can be adapted to acquire substantial light-absorbing properties to protect the wearer's eyes in bright sunlight. The filter materials can then regain their original transparent properties when the wearer moves back into the shade. Such materials can also be used as camera filters to regulate film exposure in photographing the firing of rocket engines and the like where sudden and substantial changes in light intensity may occur. Further, if the variable density material is homogeneous so that the different parts of the material respond proportionately to the intensity of the light to which the different parts of the material are exposed, light images projected upon the filter materials can be recorded on the material and can be retained on the material for a selected period of time. Thus the filter materials can serve as means for temporarily storing image data and can be used for this purpose in certain image data processing systems.

It is an object of this invention to provide a novel and improved variable density light-transmitting means; to provide a light-filter material which automatically varies in optical density in response to variation of the light incident on the material; and to provide such a material in which the variation in optical density in each portion of the material is proportional to the variation of the light incident upon the respective portion of the material.

It is another object of this invention to provide such a filter material which is substantially completely transparent under selected lighting conditions but which can acquire substantial light-absorbing properties when exposed to light of greater intensity; to provide such a light-absorbing material which is rapidly responsive to variations in the light incident thereon; and to provide such a material which can be repeatedly varied in optical density for a substantial period of time without significant loss or reduction of its variable density properties.

It is a particular object of this invention to provide a variable density light-absorbing material or device which is capable of temporarily recording a light image projected upon the material; to provide such a material which can record a light image with good contrast and useful image resolution; and to provide such a material which can record a light image temporarily for a selected, useful period of time.

Other objects of this invention are to provide novel and improved variable density light filters which are of simple and rugged construction, which can be readily manufactured, and which can be conveniently handled. It is also an object of this invention to provide novel and improved methods for making such light-filter materials.

Briefly described, the variable density light-transmitting device provided by this invention includes a gel such as a silica gel or gelatine having a liquid phase and a solid phase. The liquid phase or portion of the gel embodies a photochromic liquid such as an acidified aqueous solution of a thiazine dye and stannous chloride which is adapted to vary in optical density in response to variations in incident light. The solid phase or portion of the gel comprises a very fine network or honeycomb structure which in itself transmits light but which holds the liquid phase of the gel within the pores of the network. Preferably the gel is encapsulated in a light-transmitting member such as a flat glass cell or lens or the like for excluding extraneous oxidizing agents from the gel.

In this arrangement, the device can transmit a selected amount of light or can even be completely transparent under certain light conditions but can be adapted to acquire much greater light-absorbing properties in much the same manner as would the photochromic liquid by itself when exposed to light of greater intensity. The device can also regain its original light-transmitting or transparent properties within a short time after the original light conditions are restored. Further, where the solid phase of the gel holds the photochromic liquid within the pores of an exceedingly fine network as provided by this invention, each different part of the device can vary in optical density to a different extent in accordance with the intensity of the light incident in each part. This means that when a light image is formed or projected upon a surface of the device so that different parts of the device are exposed to different light intensities, the different parts of the device can vary in optical density to different extents to temporarily record the light image with a useful degree of image resolution on the device surface.

The variable density light-transmitting device of this invention is made by providing a photochromic liquid, preferably comprising an acidified aqueous solution of a thiazine dye and stannous chloride, and by incorporating the photochromic liquid in the liquid phase of a suitable gel such as a silica gel or gelatine. In a preferred embodiment of this invention, the photochromic liquid is combined with gel-forming ingredients such as a silica sol or a silicate solution. This combination is then gelled, preferably by regulation of the acidity of the combined materials, to incorporate the photochromic liquid in the liquid phase of the gel. In an alternative embodiment of this method invention, gelatine is immersed in a photochromic liquid to introduce the photochromic liquid into the liquid phase of the gelatine by imbibition. In either event, the gel is preferably encapsulated in a light-transmitting glass or plastic member or the like for excluding extraneous oxidizing agents from the gel.

Other objects, advantages and details of the light-filter materials and methods for making the materials provided by this invention appear in the following detailed description of preferred embodiments of the invention, the description referring to the drawings in which:

FIG. 1 is a plan view of the variable density light-transmitting device provided by this invention;

FIG. 2 is a section view along line 2—2 of FIG. 1;

FIG. 3 is a partial section view to greatly enlarged scale along line 3—3 of FIG. 2;

FIG. 4 is a diagrammatic view illustrating a step in one method for making the device of this invention;

FIG. 5 is a graph illustrating variation in the light-absorbing properties of the device of this invention;

FIG. 6 is a diagrammatic view illustrating projection of a light image onto the device of FIG. 1; and FIGS. 7–9 inclusive illustrate the temporary recording of said light image by the device.

In preparing variable density light filter materials according to this invention, a photochromic liquid is provided which is adapted to vary in optical density or light-absorbing properties in response to variations in the light to which the liquid is exposed. Preferably the photochromic liquid comprises a leuco base of a thiazine dye such as Azure A, Azure B, Azure C, Toluidine Blue O, Methylene Blue, New Methylene Blue, Methylene Blue MT, Thionine or Thionine Blue which is placed in aqueous solution with stannous chloride and which is preferably acidified with a mineral acid such as hydrogen chloride.

In a preferred embodiment of this invention, for example, the dye Toluidine Blue O is placed in a 0.72 molar solution of hydrochloric acid in a concentration of 20 grams of dye per liter of acid together with stannous chloride, also in concentration of 20 grams per liter. The stannous chloride interacts with the Toluidine Blue O to form leuco Toluidine Blue O. During this reaction, the color of the solution changes from a very dark blue to brown. The resulting brown solution is then decolorized with activated charcoal in conventional manner to provide a stock photochromic liquid which displays a high degree of photochromism. That is, the solution is substantially colorless in a room having more or less average artificial illumination. However, when irradiated with ultraviolet and short wavelength visible light of relatively greater intensities, the solution rapidly acquires a blue color and displays substantially increased light-absorbing properties. The solution then regains its high transmission properties when average artificial illumination levels are restored. Other examples of leuco photochromic liquids embodying various concentrations of thiazine dyes and stannous chloride in aqueous solutions suitable for use in this invention are described in the copending commonly-owned application for patent Ser. No. 274,415 filed on Apr. 22, 1963 by Richard J. Hovey.

In accordance with this invention, ingredients are also provided for forming a suitable gel such as a silica gel. These ingredients are then combined with the selected photochromic liquid and are gelled to incorporate the photochromic liquid in the liquid phase of the gel. For example, the gel-forming ingredients preferably include an aqueous sodium silicate solution prepared by diluting Fisher sodium silicate (40–42 Bé.) with an equal volume of water to form a sodium silicate solution of approximately 20% concentration. A quantity of 1.5 ml. of concentrated hydrochloric acid is then added to 18.5 ml. of the stock Toluidine Blue O solution described above to form a highly acidic photochromic solution. A quantity of 10 ml. of the described sodium silicate solution is then added slowly to the 20 ml. of the highly acidic photochromic solution with vigorous stirring by the use of a magnetic stirrer or the like. The high acidity of the leuco photochromic liquid is required to neutralize the sodium silicate solution and to assure that the combined silicate and photochromic solutions have a pH of about 2.0 or less. In this regard it should be noted that the desirable properties of photochromism are best obtained in the Toluidine Blue O and other described thiazine dye solutions where the solutions have a pH of less than about 1.3. In addition, gellation of the described sodium silicate solutions occurs at a most favorable rate under acid conditions. For these reasons, it is preferred that the acidity of the combined silicate and photochromic solutions be regulated to be less than about a pH of 2.0. The sodium silicate is added slowly to the acidic photochromic solution with vigorous stirring to avoid undesirable precipitation from the silicate solution such as might occur if the silicate solution were added too rapidly.

Preferably the combined solutions are then centrifuged for removing impurities and undissolved materials and are allowed to gel. If desired, 1 or 2 milligrams of sodium fluoride or other water soluble fluoride are added to the combined solutions to increase the rate of gellation, the addition of this amount of the fluoride ion causing the described silica gel to set at room temperature in approximately 30 minutes. This rate of gellation is substantially decreased by omission of the sodium fluoride. On the other hand, the rate is greatly increased by heating the combined solutions at temperatures up to 75° C. in a sealed container. Of course, silicate solutions of other concentrations adapted to be gelled can also be used in forming photochromic gels according to this invention. It should also be understood that the relative proportions of leuco photochromic liquids and silicate solutions combined to form suitable photochromic gels can be varied over wide ranges, the ratio of photochromic liquid to silicate solution of the concentration noted above having been successfully varied from 1:1 by volume to 10:1 by volume to form successful photochromic gels.

In an alternative system, the gel forming ingredients can include an aqueous silica sol. For example, an aqueous sol embodying 15 percent colloidal silica (silicon dioxide) of an average 7 millimicron particle size can be employed. A quantity of 4 ml. of this silica sol is preferably combined with 6 ml. of the leuco Toluidine Blue O stock solution described above. The acidity of the combined sol and photochromic solution is preferably regulated to be less than about a pH of 2.0. These materials are preferably subjected to vigorous stirring as they are combined. The combined materials can also be centrifuged for removal of impurities and undissolved materials. Gellation of the combined materials is then catalyzed by the addition of 1 or 2 milligrams of sodium fluoride and the combined materials are heated to about 70°–75° C. Under these conditions the described silica gel sets in about ½ hour. However where the combined materials are not heated but are gelled at room temperature, gellation may take several days. Of course silica sols of other silica concentrations and other particle sizes adapted to be gelled can also be used in forming photochromic gels. However it has been noted that opalescence of the gels formed from colloidal silica is reduced where the silica concentrations and particle size is relatively small. It should also be understood that relative proportions of photochromic liquids and silica sols combined to form suitable photochromic gels can be varied over wide ranges, the ratio of photochromic liquid to silica sol of the concentration noted above having been successfully varied from 1:1 by volume to about 9:1 by volume with desirable results.

In a preferred embodiment of this invention, the described silica gel is encapsulated within a suitable transparent member or cell for excluding extraneous oxidizing agents from the gel. For example, referring to FIGS. 1–3, a cell 10 is preferably formed by spacing transparent glass or plastic plates 12 and 14 with a ring 16 of similar material and by sealing the plates and ring together with a suitable epoxy resin or the like as at 18. The ring 16 is preferably provided with an opening 20 as shown in FIG. 2. In this arrangement the sodium silicate and photochromic solutions described above are combined, centrifuged, acidified and are catalyzed with fluoride ion as described above. They are then introduced into the cell 10 through the opening 20 before gellation of the solutions has proceeded to any great extent. The combined solutions are then further reacted within the cell to form a semi-rigid silica gel 22. Thereafter the opening 20 in the cell is sealed with additional epoxy resin as indicated at 24 in FIG. 2 to form a complete variable-density light-transmitting device 26. As will be understood, the transparent cell 10 serves to enclose the gell 22 so that it can be conveniently handled when employed as a light-filter means. The cell also serves to exclude extraneous oxidizing agents from the gel to prevent deterioration of the components of the photochromic gel.

As shown in FIG. 3, the silica gel 22 has a solid phase or portion 28 which comprises a very fine silica network or honeycomb structure having a multiplicity of pores or passages 30 extending through the solid phase. The gel also has the liquid phase or portion 32 incorporating the Toluidine Blue O or other photochromic solution described above, the liquid phase of the gel being held within the pores of the solid phase network. In accordance with this invention, the solid phase of the gel is light-transmitting and the desirable variable density properties of the photochromic solution are reproduced in the liquid phase of the gel. For example, a light-transmitting device 26 having a silica gel layer with a thickness $t$ of 30 mils (see FIG. 2) displays variable density or photochromic properties as shown in the graph of FIG. 4. That is, as is illustrated by curve $a$ of FIG. 4, the optical density of the device 26 for light of about 600 millimicron wavelength increases from approximately 0 to approximately 0.85 within about 60 seconds when irradiated with fairly intense light from a 6 volt, 18 amp. tungsten filament lamp of conventional design. Then, as is illustrated by curve $b$ in FIG. 4, the device substantially regains its original transparent properties within about 90 seconds after irradiation when the intense light is discontinued.

In an alternative embodiment of this invention, a variable density light-transmitting device can be formed by immersing a gelatine material in a leuco photochromic liquid of the character previously described, whereby the gelatine can imbibe the photochromic liquid into the pores of the gelatine to form the variable density device. For example as is diagrammatically illustrated in FIG. 4, a gelatine film 34 such as a blank No. 0 Kodak Wratten filter is immersed in a photochromic liquid bath 36 in a tank 38, the liquid preferably comprising the stock Toluidine Blue O solution described above. Where the liquid 36 is heated to a temperature in the order of 60°–70° C., the film 34 can imbibe a substantial quantity of the photochromic liquid into the pores of the gelatine in a few minutes to form the desired light-transmitting device. However, where the liquid is not heated, longer immersion of the film will preferably be provided for forming a suitable photochromic light-transmitting device. After the film 34 is removed from the tank 38, it can be sandwiched between glass plates in any conventional manner (not shown) if desired for excluding extraneous oxidizing agents from the film. It should be understood that various gelatine materials can be immersed in various noted photochromic liquids for forming photochromic filter materials according to this invention.

The light-transmitting devices provided by this invention incorporate photochromic gels in which photochromic liquid is embodied in the pores and passages of the solid light-transmitting phase of the gels. Therefore, as is illustrated in FIGS. 6–9, the light-transmitting devices of the invention are particularly adapted for temporarily storing image data with a useful degree of image resolution. That is, as shown in FIG. 6, a mask or template 40 can be laid over a light-transmitting device 26 of this invention and a source of light 42 rich in near ultraviolet can be arranged to irradiate the device 26 through the template aperture 44. In this way, the photochromic liquid in the device 26 which is exposed to light through the template aperture 44 is reacted to vary in optical density and to display its photochromic properties so that the image 46 of the template aperture is formed on the surface of the device 26 as shown in FIG. 7. The photochromic liquid in the device 26 which is not exposed to light from the source 42 retains its transparent or light-transmitting properties. Thereafter, when the exposure to the ultraviolet light from the source 42 is discontinued, the image 46 of the template aperture gradually fades as indicated at 46a and 46b in FIGS. 8 and 9 until the device 26 fully regains its original light-transmitting properties. Where the light-transmitting device 26 embodies a leuco Toluidine Blue O solution in a silica gel as described in the example above, irradiation of the device through a photographic negative using a well-collimated beam of light from a lamp substantially corresponding to the tungsten filament lamp previously described, the image formed on the device displayed a useful degree of image resolution and maintained good image contrast for approximately 2 minutes after exposure to the ultraviolet source had been discontinued. After an additional 2 minute period, the image had substantially completely disappeared so that the device was ready to receive another image thereon in the same manner.

It should be understood that although particular embodiments of the methods and light-transmitting devices of this invention have been described by way of illustration, this invention includes all modifications and equivalents thereof which fall within the scope of the appended claims.

We claim:
1. A photochromic device consisting essentially of a light transmitting gel selected from the group consisting of silica gel and gelatine, in which said gel is encapsulated in a light transmitting member for excluding extraneous oxidizing agents therefrom, said gel being in a network form with a multiplicity of pores, said pores containing a solution of a dissolved photochromic leuco thiazine dye and stannous chloride, said solution, upon radiation with ultra-violet light, changing to a colored form and thereafter reverting to said leuco form upon withdrawal of said ultra-violet light.

2. A photochromic device as set forth in claim 1 wherein said photochromic leuco thiazine dye is selected from the group consisting of Azure A, Azure B, Azure C, Toluidine Blue O, Methylene Blue, New Methylene Blue, Methylene Blue MT, Thionine and Thionine Blue.

3. A photochromic device consisting essentially of a light transmitting gel selected from the group consisting of silica gel and gelatine, in which said gel is encapsulated in a light transmitting member for excluding extraneous oxidizing agents from the gel, said gel being in a network form with a multiplicity of pores, said pores containing a solution of an acidified aqueous medium with a pH of approximately 2.0 or less, said solution consisting essentially of a dissolved photochromic leuco thiazine dye and stannous chloride, said solution, upon radiation with ultra-violet light, changing to a colored form and thereafter reverting to said leuco form upon withdrawal of said ultra-violet light.

4. A photochromic device as set forth in claim 3 in which said photochromic leuco thiazine dye is selected from the group consisting of Azure A, Azure B, Azure C, Toluidine Blue O, Methylene Blue, New Methylene Blue, Methylene Blue MT, Thionine and Thionine Blue.

References Cited
UNITED STATES PATENTS

| | | | |
|---|---|---|---|
| 2,076,984 | 4/1937 | Eggert et al. | 252—300 X |
| 2,710,274 | 6/1955 | Kuehl | 252—300 X |
| 3,266,370 | 8/1966 | Marks et al. | 88—106 X |

LEON D. ROSDOL, *Primary Examiner.*

R. D. LOVERING, *Assistant Examiner.*